July 15, 1941.  E. R. WOLFERT  2,249,074
REFRIGERATING APPARATUS
Filed Feb. 26, 1938  3 Sheets-Sheet 2

INVENTOR
EDWARD R. WOLFERT.
BY
ATTORNEY

Patented July 15, 1941

2,249,074

UNITED STATES PATENT OFFICE 2,249,074

REFRIGERATING APPARATUS

Edward R. Wolfert, Springfield, Mass., assignor to Westinghouse Electric & Manufacturing Company, East Pittsburgh, Pa., a corporation of Pennsylvania Application February 26, 1938, Serial No. 192,693

12 Claims. (Cl. 62—115)

My invention relates to refrigerating apparatus, more particularly to a refrigerant evaporator for cooling liquid, and it has for an object to provide an improved evaporator.

A further object is to provide an evaporator in which a high rate of heat transfer is obtained, whereby a high capacity and low temperature difference between the refrigerant and the liquid to be cooled may be obtained for a given size of evaporator.

The preferred embodiment of my invention comprises a vertically disposed cylindrical tank and a group of helical water coils therein. The tank has an inlet for liquid refrigerant adjacent the bottom and an outlet for vaporized refrigerant adjacent the top, so that refrigerant flows upwardly through the tank. The tank and the coils are of such dimensions that the vertical passages for refrigerant are somewhat restricted, thereby providing a fairly high velocity and violent turbulence of the refrigerant flowing upwardly therethrough. The top of the group of coils is spaced from the top of the tank to provide a space or chamber wherein liquid refrigerant is separated from the vaporized refrigerant.

The preferred embodiment further includes a heat exchanger wherein the vaporized refrigerant is conveyed in heat transfer relation to the condensed refrigerant. The supply of liquid refrigerant to the evaporator is controlled by a thermostatic expansion valve whose thermostatic bulb is subjected to the temperature of the vaporized refrigerant leaving the heat exchanger.

I have found that apparatus constructed and dimensioned as herein described provides a very high rate of heat transfer.

These and other objects are effected by my invention as will be apparent from the following description and claims taken in accordance with the accompanying drawings, forming a part of this application, in which:

Figure 1:
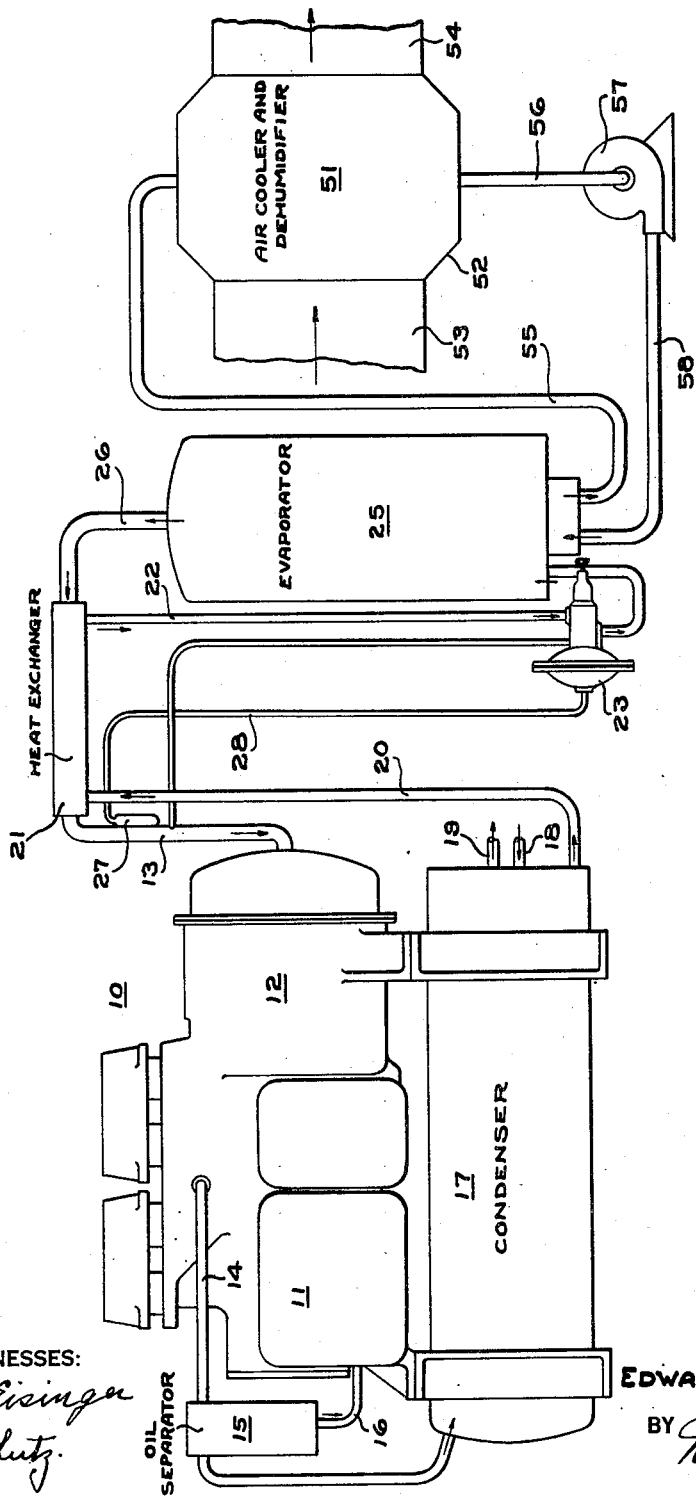
Fig. 1 is a diagrammatic view of a refrigerating system embodying my invention.

Referring first to Fig. 1, I show a refrigerating system for cooling water used in an air conditioning system. The refrigerating system contains a refrigerant charge of dichlorodifluoromethane, and includes an enclosed motor compressor unit 10 comprising a compressor 11 and a motor 12. The compressor 11 has a displacement of 85 cubic feet of refrigerant vapor per minute. Vaporized refrigerant is conveyed to the motor compressor unit through a suction conduit 13, and the compressed refrigerant is conveyed therefrom through a conduit 14 to an oil separator 15 having an oil return conduit 16 connected to the crank case of the compressor. The compressed refrigerant is then conveyed to a water cooled condenser 17 having an inlet 18 and an outlet 19 for cooling water. The condenser also serves as a liquid receiver, the condensed or liquid refrigerant collected in the bottom thereof being conveyed through a conduit 20 to one passage of a heat exchanger 21 in which it flows in heat transfer relation to the vaporized refrigerant and is cooled thereby. The liquid refrigerant then flows through a conduit 22, a thermostatic expansion valve 23 and a conduit 24 to an evaporator 25. The refrigerant vaporized in the evaporator 25 is conveyed through a conduit 26 to a second passage in the heat exchanger 21, through which it flows in heat transfer relation to the liquid refrigerant flowing through the first passage, whereby any liquid particles entrained in the vapor are vaporized and the vaporized refrigerant is superheated. The superheated refrigerant vapor is then returned by the conduit 13 to the motor compressor unit 10 to be recirculated.

The thermostatic expansion valve controls the flow of refrigerant therethrough in response to the superheat of the vaporized refrigerant discharged from the heat exchanger 21 into the conduit 13. To this end, it is provided with a thermostatic bulb 27 which is disposed in contact with the conduit 13, the pressure in the bulb 27 biasing the valve in opening direction. The valve 23 is also responsive to the pressure of said vaporized refrigerant, which pressure is communicated to the valve through a tube 28 and imposed thereon in valve closing direction. The difference in the pressure is a measure of superheat, biasing the valve in opening direction and causing the same to regulate the flow of refrigerant so as to maintain said superheat substantially constant. Since the pressure in the conduit 13 does not vary greatly from the pressure in the conduit 24 and the evaporator 25, or at least varies in predetermined relation thereto, it may be feasible in some instances merely to take the pressure at the outlet side of the valve 23, suitable adjustment of the valve 23 being made to compensate for the pressure drop of the refrigerant occurring between the valve 23 and the conduit 13.

Figure 2:
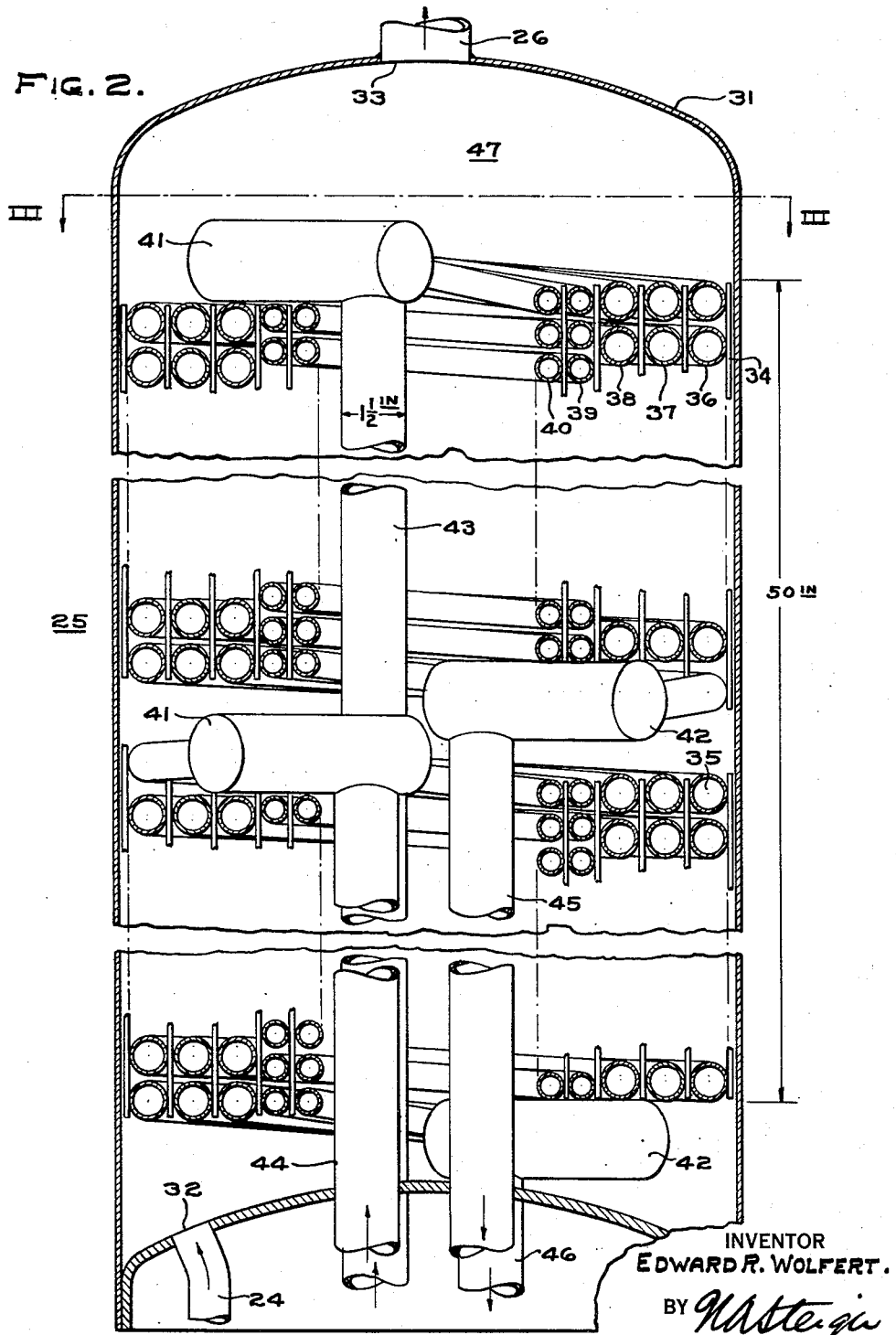
Fig. 2 is a vertical section of the evaporator chamber.
Figure 3:
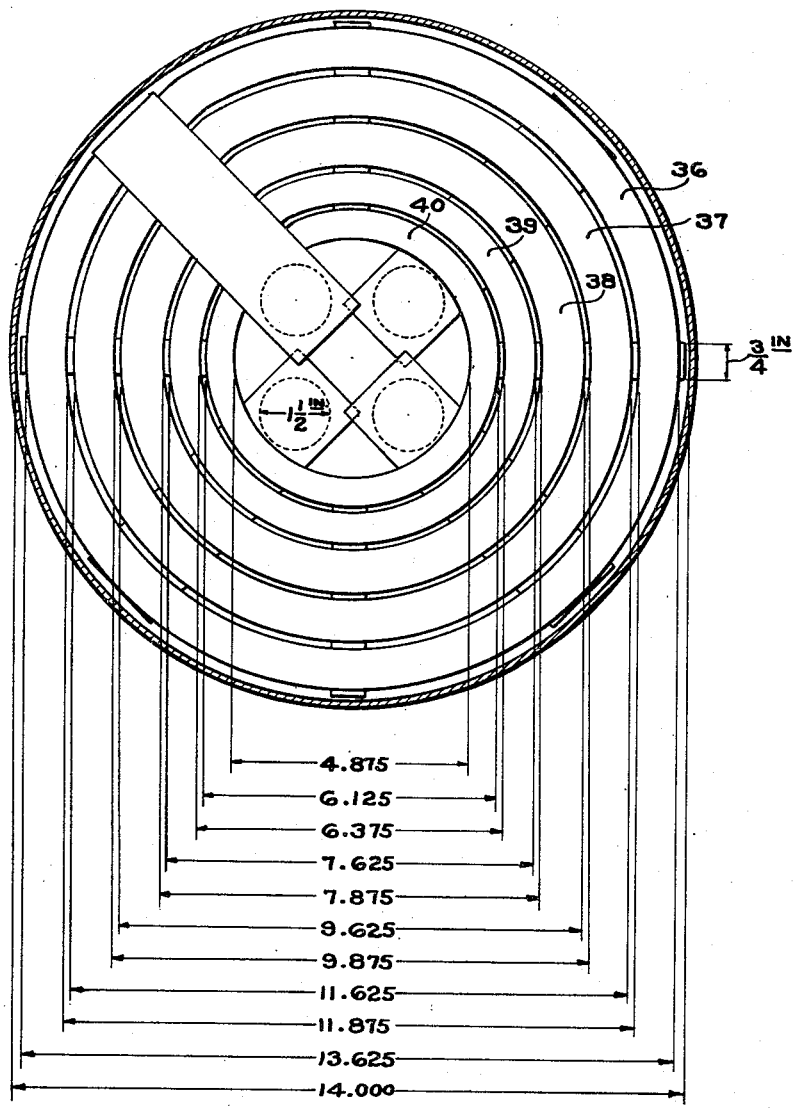
Fig. 3 is a horizontal section of the evaporator chamber taken on the section line III—III of Fig. 2.

The evaporator 25, shown in greater detail in Figs. 2 and 3, includes a vertically disposed elongated cylindrical tank 31. The supply conduit 24 is connected to the tank 31 at the bottom thereof as shown at 32, and the suction conduit 26 is connected to the top thereof as shown at 33. Two helical pipe coil units 34 and 35, for conveying water to be cooled by the evaporator, are disposed within the tank. Each coil unit comprises five helical coils, 36 to 40, arranged in telescoped relation and connected at their upper and lower ends to manifolds 41 and 42, respectively. The manifolds 41 at the upper ends of the coil units 34 and 35 are connected to vertical pipes 43 and 44, respectively, while the manifolds 42 at the lower ends are connected to vertical pipes 45 and 46, respectively. By providing two coil units, it is readily possible to provide for flow of water through the coil units either in series or in parallel according to the temperature drop of the water to be effected in the particular installation. So far as the present invention is concerned, the two coil units might be combined into a single coil unit. In the illustrated embodiment, the coil units are connected in parallel.

It will be noted from this coil structure that there are provided vertical passages for flow of refrigerant between the outermost coil 36 and the cylindrical wall of the tank, between adjacent coils, and within the innermost coil 40. The dimensions of these coils and of the inner diameter of the tank are given in Figs. 2 and 3. From these figures, the cross-sectional or flow area of the refrigerant passages may be computed. It will be found that, for the coil unit 34, there is a flow area of 34.64 sq. in. In arriving at this figure, each coil has been considered as solid between the inner and outer diameters thereof, that is, the irregular space between adjacent turns of each coil has not been considered. For the coil unit 35, the flow area is 31.66 sq. in., which is less than that of the coil unit 34 due to the fact that the vertical pipes 44 and 45 decrease the passage within the innermost coil 40. The total length of the refrigerant passages past both of the coil units 34 and 35 is substantially 47.5 inches.

The water cooled in the coil units 34 and 35 may be used for any purpose for which cooled water may be desired, for example, it may be used in an air cooler and dehumidifier 51. The latter comprises a chamber 52 to which air is delivered through a duct 53 and from which it is discharged through a duct 54, the flow of air being effected in any suitable manner, not material to this invention. The cooled water is conveyed from the coil units to the air cooler and dehumidifier 51 through a conduit 55, connected to the vertical pipes 45 and 46. In the latter, it serves to cool the air flowing through the chamber 52. It then flows through a conduit 56 to a pump 57, from which it is forced through a conduit 58 back to the coil units, the conduit 58 being connected to the vertical pipes 43 and 44.

Operation

The operation of the refrigerating system in general will be apparent from the above description of the apparatus, and a description of the operation of the evaporator and of the control of the flow of refrigerant thereto will suffice. As the liquid refrigerant passes through the valve 23, it is partially vaporized due to the reduction in pressure thereof. Therefore, a mixture of liquid and vaporous refrigerant is conveyed to the conduit 24 and admitted to the tank 31 of the evaporator. The vaporous refrigerant, being lighter, rises to the top. The flow passages for refrigerant provided by the present invention, as disclosed herein, are of such restricted flow area that there is provided a high velocity of this vaporous refrigerant. Vaporization of liquid in contact with the coils is continuously being effected, adding to the volume of vaporized refrigerant flowing upwardly. I have found that the resulting action is a violent ebullition or turbulence, so that there is a high velocity of liquid refrigerant over the outer surfaces of the coils. It is well known that increase in velocity increases the rate of heat transfer. At the same time, the velocity of the refrigerant vapor is sufficiently low to permit partial separation of the refrigerant vapor from the mixture, leaving a relatively high proportion of liquid refrigerant in the mixture. It appears that the high proportion of liquid, violently agitated, is effective to provide substantially continuous and complete wetting of the surface of the coils, so that the heat flowing through the walls of the coils is readily removed by vaporization of liquid refrigerant from the surfaces of the coils. In the apparatus described above, I find that when the apparatus is shut down, the liquid level drops to a point at about ⅓ the height of the coil assembly. Accordingly, the average proportion of the mixture is ⅓ liquid and ⅔ vapor. Due to the vaporization of refrigerant along the length of the coils, the proportion is not uniform, the vapor constituent progressively increasing from the lower to the upper end of the refrigerant passages.

I have found from tests using an evaporator as shown in the drawings that a high rate of heat transfer is obtained when removing vaporized refrigerant therefrom at the rate of 85 c. f. m., or 2.45 c. f. m. for each square inch of flow area of the refrigerant passages at the upper end thereof. I have found that a high rate of heat transfer is also attained when the rate of vapor removal is reduced to as low as 31 c. f. m., or .89 c. f. m. for each square inch of flow area at the upper or leaving end. Accordingly, it appears that there should be a total flow equal to at least .89 c. f. m. of refrigerant vapor leaving the refrigerant passages per square inch of flow area at the outlet end thereof. In the above-mentioned tests, the water flowing through the coils was cooled to a temperature of 40° F.

The top of the coil unit 34 is spaced from the top wall of the tank 31 a sufficient distance to provide a vapor space 47. In this space, a sufficiently low velocity of the refrigerant is effected so that most of the liquid refrigerant separates by gravity from the vaporized refrigerant. The refrigerant removed from the tank 31 through the conduit 26, therefore, comprises primarily vaporized refrigerant, there being only a relatively small quantity of finely divided particles of liquid refrigerant entrained therein. These particles of liquid refrigerant are vaporized in the heat exchanger 21 by heat abstracted from the liquid refrigerant flowing through the first passage thereof.

In the evaporator above described, there is also a sufficient supply of heat, from the water to be cooled flowing through the coils, to vaporize the quantity of liquid refrigerant providing the required flow of vaporized refrigerant.

Another factor contributing to the agitation of the refrigerant is the irregular form of the refrigerant passages provided by the helical coils.

Such passages alternately increase and decrease in flow area, the wide areas giving the liquid a chance to separate while the vaporized refrigerant issuing at high velocity from the narrow points between the tubes provides violent agitation of the liquid.

The control of the admission of refrigerant to the evaporator, so as to provide sufficient mixture of liquid and vaporous refrigerant to extend to the top of the coil units without permitting any appreciable quantity of the liquid portion of the mixture to pass into the suction line, constitutes another and important feature of the present invention. This is accomplished by the thermostatic expansion valve in connection with the heat exchanger 21 arranged as described above. As already stated, in the heat exchanger 21, the liquid particles entrained in the refrigerant vapor are vaporized and the refrigerant vapor is then superheated. The thermostatic expansion valve controls in response to this superheat. Its action is as follows: If too much refrigerant is admitted to the evaporator, then more liquid refrigerant will enter the separating space 47 and a greater quantity of entrained liquid refrigerant will pass into the suction conduit 26. The vaporous refrigerant, therefore, will not be superheated to as great an extent in the heat exchanger 21, since more of the heat is required to vaporize the liquid particles. In response to the decrease in superheat, the thermostatic expansion valve 23 decreases the admission of refrigerant to the evaporator.

If too small a quantity of refrigerant is admitted to the evaporator, then there will be a decrease in the quantity of liquid refrigerant in the separating space 47 and a smaller quantity will be entrained in the vaporous refrigerant. Thus, the vaporous refrigerant will be superheated to a greater extent in the heat exchanger 21, and the thermostatic expansion valve 23 will respond to the increased superheat to increase the admission of refrigerant to the evaporator.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In refrigerating apparatus, the combination of a compressor, a condenser, an expansion device, an evaporator chamber, a conduit or conduits for fluid to be cooled arranged in said chamber to form a vertical passage or passages for flow of refrigerant exteriorly of said conduit or conduits, means for admitting a mixture of liquid and vaporous refrigerant to said chamber, and means for removing vaporized refrigerant from the upper portion of said chamber, said passage or passages having such cross-sectional area or areas, in relation to the capacity of said compressor, as to provide a total flow of vaporized refrigerant leaving said passage or passages equal to at least .89 cubic foot per minute per square inch of flow area of said passage or passages at the upper end thereof, and to provide such velocity of refrigerant in said passage or passages as to insure complete submergence of said conduit or conduits in a boiling mixture of liquid and vaporous refrigerant, thereby effecting substantially complete wetting of the surfaces of said conduit or conduits.

2. Refrigerating apparatus as set forth in claim 1, wherein the mixture of liquid and vaporous refrigerant is admitted to said container adjacent the lower end of said passage or passages.

3. In refrigerating apparatus, the combination of a compressor, a condenser, an expansion device, a tank, a coil within the tank arranged to provide a vertical passage or passages for flow of refrigerant, means for circulating liquid to be cooled through the coil, means for admitting refrigerant from the expansion device to said tank adjacent the bottom thereof, and means for withdrawing vaporized refrigerant from said tank adjacent the top thereof and conveying the same to the inlet of the compressor, said refrigerant passage or passages having sufficiently restricted flow areas in relation to the volumetric capacity of the compressor to provide a total flow of vaporized refrigerant leaving said passage or passages equal to at least .89 cubic foot and not more than 2.45 cubic feet per minute per square inch of flow area of said passage or passages at its upper end.

4. In refrigerating apparatus, the combination of a compressor, a condenser, an expansion device, an evaporating chamber, a conduit or conduits in said chamber for conveying liquid to be cooled in heat transfer relation to the refrigerant in the chamber and arranged to provide a vertically-extending refrigerant passage or passages within said chamber, means for admitting refrigerant from said expansion device to the lower end of said passage or passages and means for removing vaporized refrigerant from said chamber adjacent the top thereof, said passage or passages having such flow area or areas, in relation to the capacity of said compressor, as to provide a total flow of vaporized refrigerant leaving said passage or passages equal to at least .89 cubic foot per minute per square inch of flow area of said passage or passages at the upper end thereof and a velocity sufficiently low so that substantially all the liquid refrigerant may separate from the vaporized refrigerant in said chamber and flow downwardly by gravity through said passage or passages.

5. In refrigerating apparatus, the combination of a compressor, a condenser, an expansion device, and an evaporator chamber connected in a refrigerant circuit containing dichlorodifluoromethane as a refrigerant, a conduit or conduits in said evaporator chamber for conveying liquid to be cooled and arranged to provide a vertically-extending passage or passages within said chamber for flow of refrigerant in heat transfer relation to the liquid within the conduit, means for admitting refrigerant from said expansion device to said evaporator chamber and means for removing vaporized refrigerant from said chamber adjacent the top thereof, said passage or passages having such flow area or areas, in relation to the capacity of said compressor, as to provide a total flow of vaporized refrigerant leaving said passage or passages equal to at least .89 cubic foot per minute per square inch of flow area of said passage or passages at its upper end and to provide a mixture of liquid and vaporous refrigerant in said chamber containing at least substantially one-third liquid by volume.

6. In refrigerating apparatus, the combination of a compressor, a condenser, an expansion device, and an evaporator chamber connected in a refrigerant circuit containing dichlorodifluoromethane as a refrigerant, a conduit or conduits in said evaporator chamber for conveying liquid to be cooled and arranged to provide a vertically-extending passage or passages within said chamber for flow of refrigerant in heat transfer relation to the liquid within the conduit, the top of said conduit or conduits being spaced from the top of said chamber to provide a liquid separating space therebetween, means for admitting refrigerant from said expansion device to said evaporator chamber and means for removing vaporized refrigerant from said chamber adjacent the top of said separating space, said passage or passages having such flow area or areas, in relation to the capacity of said compressor, as to provide a total flow of vaporized refrigerant leaving said passage or passages equal to at least .89 cubic foot per minute per square inch of flow area of said passage or passages at its upper end and to provide such velocity as to insure complete submergence of said conduit or conduits in a boiling mixture of liquid and vaporous refrigerant, thereby effecting substantially complete wetting of the surfaces of said conduit or conduits.

7. In refrigerating apparatus, the combination of a compressor, a condenser, an expansion device, a vertically-disposed cylindrical evaporator chamber, a plurality of vertically-disposed helical coils in said chamber for conveying liquid to be cooled, the top of said coils being spaced from the top of said chamber to provide a liquid separating space, means for admitting refrigerant from said expansion device to said chamber adjacent the bottom thereof, and means for removing vaporized refrigerant from said chamber adjacent the top of said separating space, said coils and the walls of said chamber being so disposed and proportioned in relation to each other and to the remainder of the system as to provide refrigerant passages through which refrigerant flows transversely of the adjacent portions of the coils from the bottom toward the top of said chamber and to provide a total flow of vaporized refrigerant leaving said passages equal to at least .89 cubic foot per minute per square inch of flow area of said passages at the upper end thereof.

8. Refrigerating apparatus as set forth in claim 7 and containing a refrigerant charge of dichlorodifluoromethane (Freon 12).

9. In refrigerating apparatus, the combination of a compressor, a condenser, an expansion device, a vertically disposed cylindrical evaporator chamber, a group of helical coils disposed concentrically about a vertical axis in said chamber for conveying liquid to be cooled, the top of said group of coils being spaced from the top of said chamber to provide a liquid separation space and being uncovered so that liquid refrigerant carried into said separation space may drop down through the spaces between adjacent coils, the interior of the innermost coil forming a vertical passage communicating with said separation space, means for admitting refrigerant from said expansion device to said chamber adjacent the bottom thereof, and means for removing vaporized refrigerant from said chamber adjacent the top of said separation space and conveying the same to said compressor, said coils and the walls of said chamber being so disposed and proportioned in relation to each other and to the remainder of the system as to provide refrigerant passages resulting in a total flow of vaporized refrigerant leaving the passages equal to at least .89 cubic foot per minute per square inch of flow area at the upper end thereof.

10. In refrigerating apparatus, the combination of a compressor, a condenser, an expansion valve, an evaporator chamber, conduit means within said chamber for conveying liquid to be cooled in heat transfer relation to the refrigerant in said chamber, a heat exchanger, means for conveying liquid refrigerant from said condenser through said heat exchanger and said expansion valve to said evaporator chamber, said liquid refrigerant flowing in contact with the outer surfaces of said conduit means in said chamber, and means for conveying vaporized refrigerant from said chamber adjacent the top thereof, and through said heat exchanger in heat transfer relation to the liquid refrigerant flowing therethrough, to the inlet of said compressor, and means for actuating said expansion valve automatically in response to the pressure of the expanded refrigerant and the temperature of the vaporized refrigerant leaving said heat exchanger to maintain a substantially constant degree of superheat of said vaporized refrigerant.

11. In refrigerating apparatus, the combination of a compressor, a condenser, an expansion valve, an evaporator chamber, conduit means within said chamber for conveying liquid to be cooled in heat transfer relation to the refrigerant in said chamber, a heat exchanger, means for conveying liquid refrigerant from said condenser through said heat exchanger and said expansion valve to said evaporator chamber, said liquid refrigerant flowing in contact with the outer surfaces of said conduit means in said chamber, and means for conveying vaporized refrigerant from said chamber adjacent the top thereof, and through said heat exchanger in heat transfer relation to the liquid refrigerant flowing therethrough, to the inlet of said compressor, and means for controlling said valve automatically in response to the superheat of the vaporized refrigerant discharged from said heat exchanger.

12. In refrigerating apparatus, the combination of a compressor, a condenser, an expansion valve, an evaporating chamber, a coil assembly within said chamber for conveying liquid to be cooled in heat transfer relation to the refrigerant in said chamber, the top of the coil assembly being spaced from the top of said chamber to provide a liquid separation space above the coil assembly, a heat exchanger, means for conveying liquid refrigerant from said condenser through said heat exchanger and said expansion valve to said evaporator chamber, said liquid refrigerant flowing in contact with the outer surfaces of said conduit means in said chamber, and means for conveying vaporized refrigerant from said chamber adjacent the top of the liquid separation space, and through said heat exchanger in heat transfer relation to the liquid refrigerant flowing therethrough, to the inlet of said compressor, and means for controlling said valve automatically in response to the superheat of the vaporized refrigerant discharged from said heat exchanger so as to maintain the surfaces of the coil assembly substantially covered with liquid refrigerant while restricting the number of liquid refrigerant particles entrained in the vaporized refrigerant removed from said evaporator chamber.

EDWARD R. WOLFERT.